United States Patent [19]
LaRue

[11] Patent Number: 5,757,799
[45] Date of Patent: May 26, 1998

[54] HIGH SPEED PACKET SWITCH

[75] Inventor: George S. LaRue, Bellevue, Wash.

[73] Assignee: The Boeing Company, Seattle, Wash.

[21] Appl. No.: 586,124

[22] Filed: Jan. 16, 1996

[51] Int. Cl.$^6$ .................................................. H04L 12/56
[52] U.S. Cl. ........................................... 370/423; 370/417
[58] Field of Search .................................. 370/362, 364, 370/398, 399, 417, 422, 423

[56] References Cited

U.S. PATENT DOCUMENTS

| | | | |
|---|---|---|---|
| 4,340,776 | 7/1982 | Ganz et al. | 370/364 |
| 4,638,475 | 1/1987 | Koike | 370/422 |
| 4,893,304 | 1/1990 | Giacopelli et al. | 370/411 |
| 5,001,706 | 3/1991 | Dighe et al. | 370/422 |
| 5,062,106 | 10/1991 | Yamazaki et al. | 370/397 |
| 5,274,642 | 12/1993 | Widjaja et al. | 370/411 |
| 5,321,691 | 6/1994 | Pashan | 370/398 |
| 5,440,553 | 8/1995 | Widjaja et al. | 370/411 |
| 5,574,885 | 11/1996 | Denzel et al. | 370/417 |

FOREIGN PATENT DOCUMENTS

| | | |
|---|---|---|
| 256 526 A2 | 2/1988 | European Pat. Off. . |
| 526 104 A2 | 2/1993 | European Pat. Off. . |
| 62-98842 | 8/1987 | Japan . |

*Primary Examiner*—Hassan Kizou
*Attorney, Agent, or Firm*—Conrad O. Gardner

[57] ABSTRACT

A high speed packet switch which is inherently non-blocking, requires a minimum amount of buffering, is modular and degrades gracefully with failures. The output destination buffers can each absorb data at the full switch rate to avoid contention and they are filled evenly to minimize buffer size. The architecture only requires few parts types (multiplexers, demultiplexers and crosspoint switches) to operate at high speeds. The output list offers considerable flexibility in the way the data is output, whether it is by priority and/or by time division multiplexed sub destinations.

8 Claims, 2 Drawing Sheets

HIGH SPEED PACKET SWITCH

FIELD OF THE INVENTION

The present invention relates to an architecture to route data packets at high speed. More particularly, the invention relates to a high speed packet switch having an architecture in which the switch is non-blocking so that no data gets lost if contentions arise, uses the minimum amount of buffer space possible (lowers cost and power), performance degrades gracefully with failures, and is able to power down sections when not in use to save power, allows for frequently changing routing, and minimizes power, cost, weight and size.

SUMMARY OF THE INVENTION

A preferred embodiment of the invention comprises a high speed switching system for electronic data packets, which includes routing information as well as data. The present system comprises a non-blocking switch with no input buffering, each destination capable of receiving data from all sources simultaneously without loss of data. The destination buffers data in a set of buffers. Each data packet is sent to the least filled buffer in the set, then returned to the output at the proper time.

BACKGROUND OF THE INVENTION

Widjaja et al. (U.S. Pat. No. 5,274,642) shows an output buffered packet switch with a flexible buffer management scheme. The buffers in the output dynamically manage different traffic loads.

Widjaja et al. (U.S. Pat. No. 5,440,553) discloses an output buffered packet switch with a flexible buffer management scheme. There is one dedicated dynamic output buffer for every output port.

Kobayashi (Japanese Pat. No. 62-98842) is illustrative of a packet switching system which devised an output buffer to share the inputs from several sources.

Yamazaki et al. (U.S. Pat. No. 5,062,106) shows an ATM exchange system which delivers the packets to the outputs via common bus. The system is output buffered. European Pat. No. EP 256,526 discloses a bus driven packet switching network which extracts information for a specific output only during given time slots.

Pashan et al. (European Pat. No. 526,104) discloses a packet switching network with shared buffer memory overflow control. The output is dynamically allocated to available memory.

Giacopelli et al. (U.S. Pat. No. 4,893,304) discloses a broadband packet switch with combined queuing. The output buffers are queued so as to reduce recirculation loops and the bandwidth requirements for one switch.

DETAILED DESCRIPTION OF THE INVENTION

Figure 1:
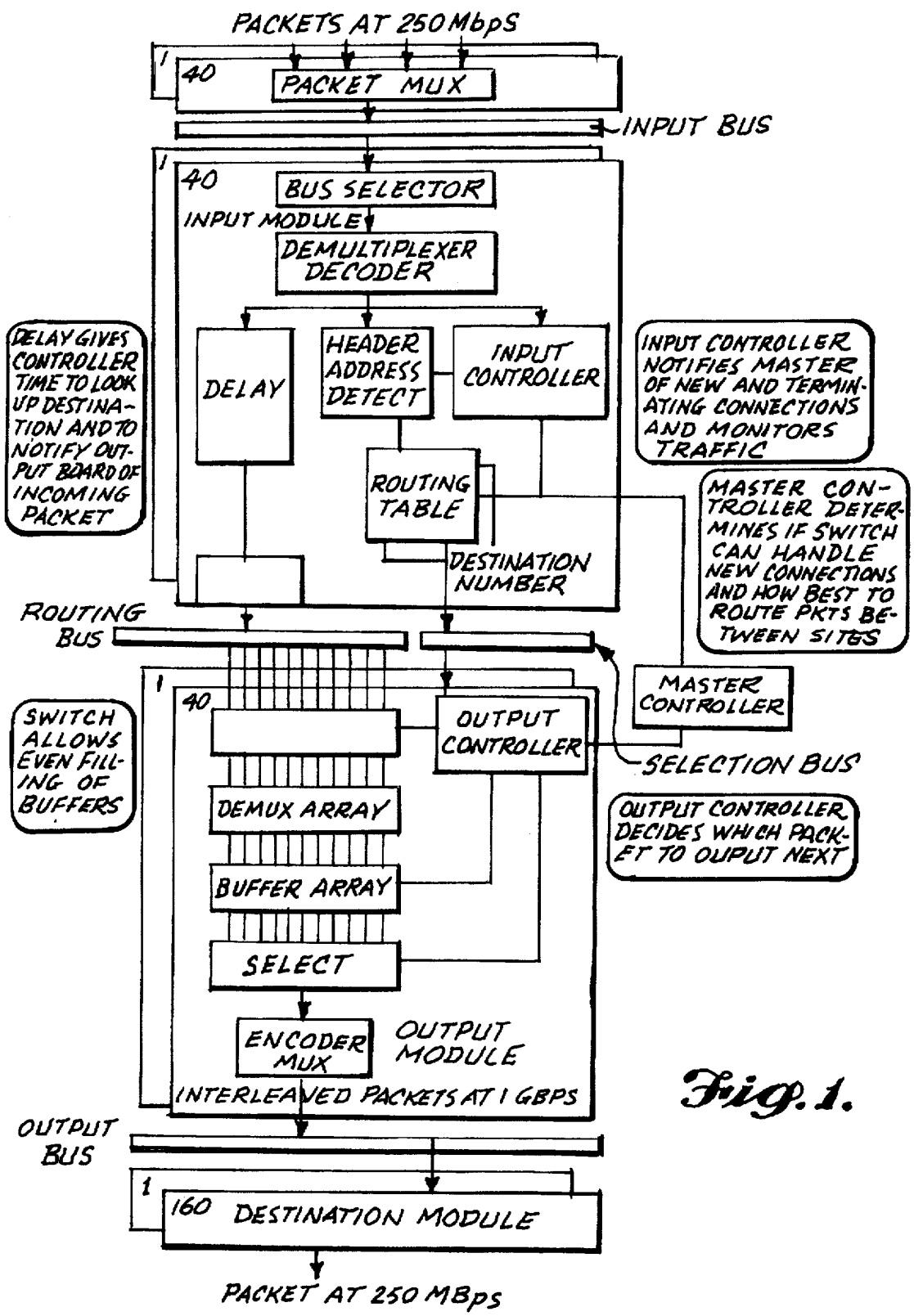
FIG. 1 is a block diagram of a preferred embodiment of the packet switch; and, FIG. 2 is a block diagram of the output module of the preferred embodiment of the packet switch shown in FIG. 1.

The hereinafter described exemplary preferred embodiment utilizes a 40 Gbps switch. The exemplary switch has 160 source channels at 250 Mbps which need to be routed to 160 destination channels also at 250 Mbps. Incoming data needs to be routed from any one of the input channels to any one of the output channels. The data are in packets of 512 bits and contain the destination address in a header.

Packet Switch Architecture

Clock Rates

For a given switching ability, the clock rates would be made as high as possible to reduce the number of interconnects. The switch in accordance with the preferred embodiment is implemented as a 40 by 40 channel switch at 1 Gbps by multiplexing and demultiplexing packets before and after the switch or 160 channels at 250 Mbps. The higher frequency has the advantage of fewer switches but this higher performance level is more difficult to achieve.

Another reason for selecting 1 Gbps is that fewer interconnect lines will save power. Even at 250 Mbps, controlled impedance transmission lines are required if signal integrity is to be maintained transmitting data over any significant distance. A 50 ohm driver will dissipate about 25 mW. 160 interconnects dissipate about 4W compared to 40 interconnects dissipating only 1W. There are many times 160 (40) interconnects in the system. Another reason is that a 40×40 crosspoint switch can readily be built on one integrated circuit (IC) while a 160×160 crosspoint switch IC would be very difficult to build at 250 Mbps.

Output Buffering

It is more efficient to buffer data at the output of a switch than at the input. If each source can send data packets whenever they are ready to be sent (after consulting the routing table) and be assured that they get to their destination, then the switch is non-blocking and no input buffers are needed. If a source does not send data during a time period because of conflicts (multiple sources contending for the same destination), then bandwidth is lost due to these conflicts. It may have been possible to have sent a different packet to another destination (a path that was not blocked). Input buffers are also required to store the packet while it is waiting for an appropriate time to send the packet. The next time an attempt is made to send this same packet, other conflicts may also arise. Also extra circuitry need to be added to determine that there are contentions, resending of packets etc.

In order to have a non-blocking switch with no input buffering, each destination must be capable of receiving data from all sources simultaneously without loss of data. Each destination must therefore be capable of receiving and buffering data at rates up to 40 Gbps for brief periods of time.

Shared Bus

Given that each destination can receive data at the full rate of the switch, a shared bus architecture is a natural choice. Each source sends its data to each and every destination. In the present illustrative embodiment, there are 40 sources at 1 Gbps each driving a serial transmission line (either electrical or optical) with all 40 destinations monitoring it. Each destination takes data from every source that is sending data to it, from no data up to data from all 40 lines. There are no complex switching algorithms needed, no blocking problems, and very little hardware needed to implement the routing.

Even Filling of Output Buffers

The design of the output buffer is crucial if this architecture is to work well. The buffer needs to accept data from up to 40 sources simultaneously with data rates of 40 Gbps. If each source's data is demultiplexed by 8 and sent to 40 separate buffers, the byte-wide buffers need to have a write cycle time of 8 ns. This is not an unreasonably high rate since the circuits can be pipelined. If each buffer monitors a single source, then the storage capacity required for the buffers depends on the expected distribution of the traffic flow. If for example, most of the data to an output channel is coming from a single input channel, then the buffer storing data from this source would overflow unless its capacity was comparable to the nominal capacity needed by the destination. (The nominal buffer size must be made large enough to store excess data during bursts or else data is lost.) Since there are 40 buffers, the single buffer per source approach should have about 40 times the buffer capacity that is required and would be very wasteful of size and cost. The buffers should fill evenly so that the buffer size can be kept to a minimum by even filling of the output buffers.

Input & Output Bus

The input bus between the packet mux modules and the input modules of the switch provides redundancy for failures of input modules. The output bus allows the destinations to be grouped differently at different time to allow the maximum number of output modules to be powered down during a given time since each module handles four destinations. It also provides flexibility and redundancy in case of circuit failures.

Implementation

The switch architecture is hereinafter described in more detail. The exemplary embodiment is illustrative of the architecture concepts.

It is assumed that there are 160 serial inputs to the switch at 250 Mbps. Each input channel consists of packet multiplexed data at 250 Mbps. The incoming data is assumed to be in packets of 512 bits. The rates referred to in this section are the unencoded data rates. Encoding may be needed to recover the clock or at least the phase of the data and may boost the bit rate by 20% to 40% above the unencoded data rates, or from 1 Gbps to 1.2 Gbps.

An overview of the architecture is shown in FIG. 1. The 160 inputs are received by 40 packet mux modules, each of which interleave packets from 4 inputs to provide multiplexed packets at 1 Gbps. Forty input modules receive the 1 Gbps packets from the packet mux modules via a 40-line high-speed bus. Each packet mux module output drives a separate 1 Gbps line which connects to all input modules. The input module is programmed to select packet data from a given packet mux module with the use of a bus selector on the input module. Each input module then looks at the header to find the destination address, accesses the routing tables to find which destination to send the data to, notifies the proper output module that a packet is coming, and then outputs the serial packet to the routing bus. In an ATM switch the header would be modified with the virtual destination address.

There are 40 output modules which receive the data from the input modules. The routing between the input and output modules is via a 40-line high-speed bus. Each input module drives a separate line which connects to every output module. A separate bus, the selection bus, allows input modules to notify the output modules which data packets to take from the high-speed bus. The output modules take only the packets that are intended for a set of destinations. The packet data is stored in a buffer and output to the output bus. The output bus is similar to the 40-line high-speed bus in that each output module drives a separate 1 Gbps line. Each destination module receives data packets from only one output module during a given time. The destination modules perform the packet demultiplexing. Each of these only takes every fourth packet from the 1 Gbps bus and output the data at 250 Mbps.

Input Modules

FIG. 1 includes the block diagram of an input module. It receives multiplexed packet data at 1 Gbps from the inputs section. A demultiplexer converts the serial data into parallel words. The data is framed and put into a first-in first-out (FIFO) buffer which delays the data. A circuit looks at the data to determine the destination address in the header. This address is used to find the destination schedule in the routing table. The routing table is doubled buffered so that one routing table can be accessed while the master switch controller updates the other table with new source-destination pairs. The destination number for the packet is output and then sent to the output modules so that they can tell if they should grab the next packet of data on this module's high-speed bus line. After the output boards are notified and ready to accept the proper packets, the delayed FIFO data is multiplexed to 1 Gbps and sends the packet data over the high-speed bus.

The packet data arriving at the input modules do not need to be synchronous. On the 40-line high-speed routing bus, however, packets must all start at the same time. There will be some small variation as to when the packets arrive at the output modules due to unequal transmission delays. The input and output modules are sent a cycle start signal to synchronize to each other. At 1 Gbps, a 512 but packet takes about 500 ns to be transmitted. While one packet is being transmitted, the output modules are being notified which packets to accept during the next cycle. There only needs to be a gap of about 10 ns between packets to allow the crosspoint switches on the output modules to be updated. This also assumes that clock recovery of the 1 Gbps data is accomplished within a few bit times.

Since there are 40 input modules and the output modules need to be notified in one cycle of 500 ns, there is an average of about 10 ns for each input module to notify an output module to take the data. One method to accomplish this is for the input module driving the nth routing bus line to transmit the output module number determined by the routing table during the nth time slot. Thus, the time slot number equals the routing bus line number. The cycle start and a 100 MHz clock are used by the modules to determine the time slots. There are 160 destinations so that this selection bus needs to be at least 8 bits wide.

High-speed bus

The 40-line 1 Gbps routing bus connects an input module to all 40 output modules. The input module has the only bus driver. The output modules just receive. This is a unidirectional bus and buffers can be added to improve signal integrity.

The bus could be implemented with optics. The light from a laser could be divided into 40 and sent to each output module. The power dissipation and the parts count would be higher than the all electrical approach.

The 40-line 1Gbps input bus connects a packet mux module to all 40 input modules. These are also unidirectional busses. The 40-line 1Gbps output bus connects an output module to all 160 destination modules.

Output Modules

Figure 2:
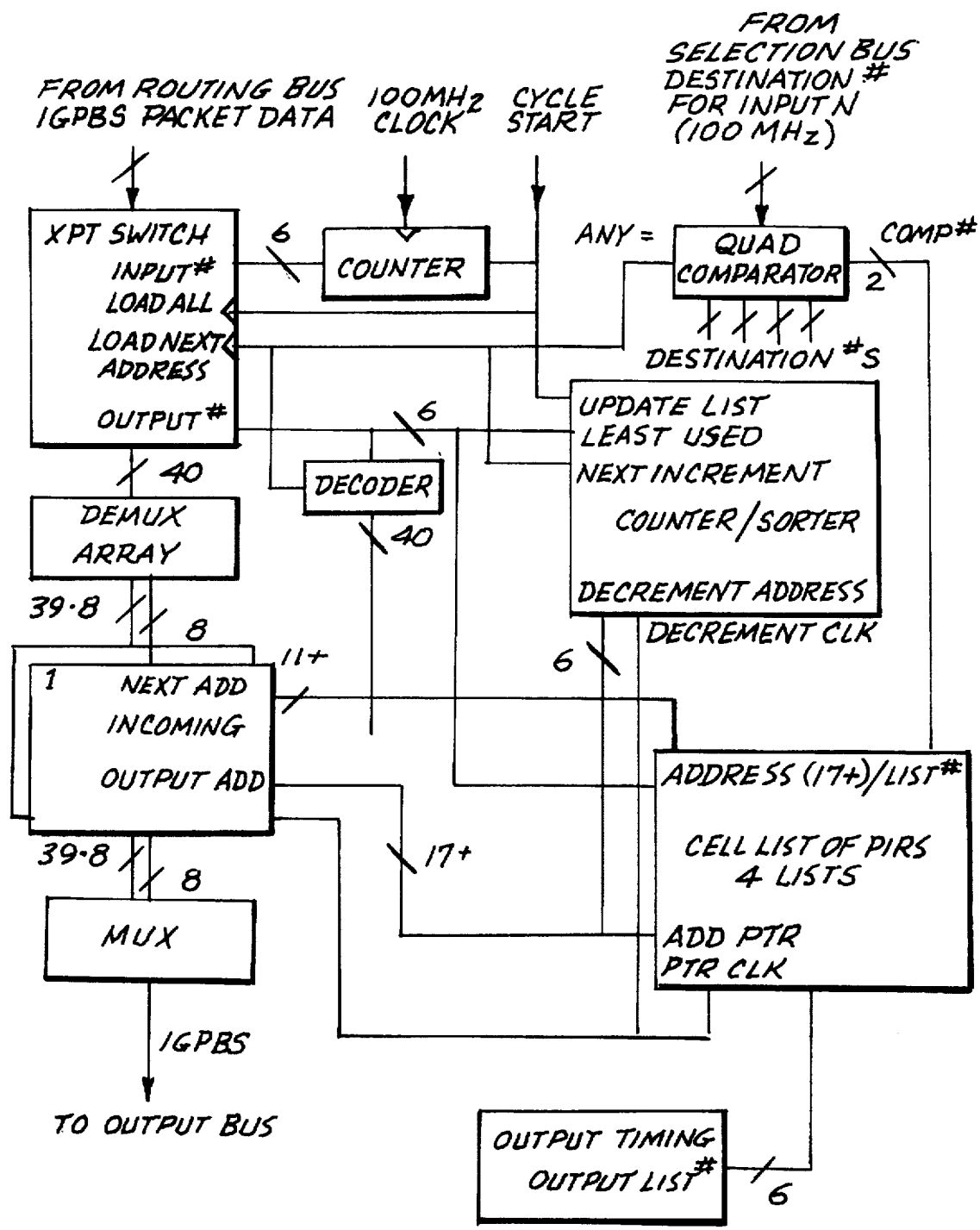

The output module block diagram is shown in FIG. 2. A 40 by 40 crosspoint switch receives the packet data from the high-speed bus. The architecture of the crosspoint switch is such that it allows data to flow through the switch with a given routing at the same time that new routing information is being loaded into buffers on the chip. At the end of a packet cycle, the new routing information is transferred from the buffers to another register that controls the switches. The crosspoint switch can switch from one configuration to the next in a few nanoseconds.

The purpose of the crosspoint switch is to route the data meant for this output module to the least filled buffer. The outputs of the crosspoint switch are connected to 40 demultiplexers. These slow down the data so that slower speed memories can be used to buffer the packets until they can be transmitted.

A counter/sorter circuit keeps track of the least filled buffers. It contains 40 registers which are incremented every time a packet is put into its corresponding buffer and is decremented every time a packet is output. Every packet cycle sorts the registers so that the least filled buffers are put at the top of a stack.

The output module is notified that an input module will be sending a packet during the next cycle, when the value on the selection bus matches one of the destination numbers of that output module. The crosspoint switch is set so that the data from the proper input line is sent to the least filled buffer. The number from the top of the stack is used as the output address while the time slot number is used as the input address. This setting is loaded into the crosspoint input buffers. The register in the counter/sorter is incremented and the buffer is notified that it has incoming data. The time slot number, equal to the routing bus time number is determined simply by the use of a counter to count the number of 10 ns time slots from the previous cycle start signal. The cycle start signal configures the crosspoint switch with new settings.

When the buffer is notified that it is to receive the next packet, it tells the pointer-list circuit what the starting address for that packet will be. The buffer circuits are dual-port RAMs, not FIFOs. The order that data comes into the module is not necessarily the order it should leave.

The list circuit organizes the pointers into 4 lists, one for each destination. Each output module handles 4 destinations. In the case of a larger number of outputs than 160, then each output module could handle more destinations; i.e. if there were 1600 destinations at 25 Mbps, then each output module would handle 40 destinations. There is an output timing circuit that keeps track of when to send data to the destinations. It sends one of the list addresses to the list circuit at the appropriate time. The packets from an output module are interleaved among the 4 destinations. With this ordering, a destination needs to take every fourth packet from the output bus. The list circuit decides what packet to send next from that list. The list could be sorted based on priority or other criteria. The input module can determine the priority from the header and convey this priority information to the output module with additional bits on the selection bus. The output module then outputs the pointer of the starting address to the proper buffer which starts outputting the packet. A multiplexer up converts the buffer outputs to a rate of 1 Gbps and puts this on the output bus.

If a destination were to contain, e.g. 10, time division multiplexed (TDM) subdestinations then the output module could perform the required TDM ordering. The list circuit could store the data in 10 lists in this case and interleave the appropriate 10 lists at the proper time to the output bus.

The demultiplexers are 1:8 and output data to the buffers at 15.6 MB per second. Power is saved by reducing the number of interconnects. The buffer could immediately demultiplex the data to slower easier to handle rates. The buffers do not need fast access times. Internally the RAMs could store data 32 or 64 bits wide. It may not be necessary to use dual-port RAM cells if read cycles are interleaved with write cycles. This may save power and cost.

The demultiplexers need to have a separate clock for each channel or at least a separate phase. The clock recovery circuits need to respond within a few nanoseconds to reduce the dead time between packet cycles. If all of the input modules use the same clock frequency then simpler phase alignment circuits could be used to insure that the demultiplexer latches in the correct data. Another option is to have clock recovery and data alignment before the crosspoint switch to make the data through the crosspoint be in lock step so that all demultiplexers would operate off the same clock.

Destination Modules

These modules take every fourth packet from the output bus and outputs data at 250 Mbps to the destination.

As hereinabove described, in the present system the input packets are first processed by the packet mux module, which multiplexes the data on a packet by packet basis and sends the packets unmodified to the input module. The input modules determine from the header and a lookup table, which output module needs to handle the packet. The input module sends the packet unchanged to the output module. It also sends signals on selection bus to the output modules on which packets to choose for storage. The output buffers select which packets to store and stores them into the buffers evenly by the means of a crosspoint switch. Multiple priorities can be handled. The switch can be made fault tolerant with redundant modules. Unused modules can be powered down without effecting switching. Large buffers are easily accommodated.

Key features and advantages of the present system include:

(a) Even filling of the output buffers prevents individual buffers making up the output buffer from overflowing. This allows effective use of output buffer storage and buffers consisting of separate RAMs make large output buffers possible.

(b) Packets are passed to output modules unchanged to decrease delay.

(c) Information to output modules as to which packets to store are on a separate selection bus. Broadcast of packets to several different destinations can be handled by telling more than one output module to store the data by means of the selection bus.

(d) Several output channels can be handled by one output module if these channels are at a lower rate (i.e. 1 channel at 1200 Mbps or 4 channels at 300 Mbps). Requires separate lists for each channel so that they can be interleaved.

(e) Packets with different priority can be easily handled with the use of separate lists for each priority. If memory gets full, new low priority packets can be dropped and/or previously stored low priority packets can be overwritten.

(f) Output modules are programmable as to which channel they handle to make switch fault tolerant. Redundant input modules also give fault tolerance. Input and output buses are required for this.

(g) Unused input and output modules can be powered down when not in use without effecting operation of rest of switch.

(h) Address look-up tables can be double buffered to allow for quick changes in routing.

The preceding and further advantages will appear to those skilled in the art upon a reading of the foregoing specification.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

What is claimed:

1. In combination in a packet switching system:

a plurality of output modules;

a plurality of input modules for directing a packet to one of said plurality of output modules;

a plurality of packet mux modules; an input bus to transmit packets from the packet mux modules to said plurality of input modules;

a routing bus to broadcast packets from said input modules to said plurality of output modules;

a selection bus for transmitting signals from input medolues to output modules for selecting packets from the routing bus for storage each output module including;

output buffers for storing packets;

a crosspoint switch to allow even filling of said output buffers.

2. The combination according to claim 1 wherein said output buffers consist of separate RAM devices.

3. The combination according to claim 1 wherein said selection bus provides broadcast of packets to several different output modules.

4. The combination according to claim 1 wherein each of said output modules is programmable as to which destinations it handles.

5. The combination according to claim 4 wherein said output modules handle multiple destinations.

6. The combination according to claim 1 including means for powering down unused ones of said packet mux, input and output modules.

7. The combination according to claim 1 wherein each of said input modules is programmable as to which said packet mux module it receives data from.

8. The combination according to claim 1 wherein said output modules have sorted output lists based on priority.

* * * * *